United States Patent [19]

Martin et al.

[11] Patent Number: 4,958,710
[45] Date of Patent: Sep. 25, 1990

[54] FLUID FRICTION CLUTCH WITH A TEMPERATURE CONTROL

[75] Inventors: Hans Martin, Stuttgart; Gerhard Stütz, Renningen, both of Fed. Rep. of Germany

[73] Assignee: Suddeutsche Kuhlerfabrik, Fed. Rep. of Germany

[21] Appl. No.: 398,443

[22] Filed: Aug. 25, 1989

[30] Foreign Application Priority Data

Aug. 30, 1988 [DE] Fed. Rep. of Germany ....... 3829322

[51] Int. Cl.⁵ ............................................. F16D 35/02
[52] U.S. Cl. .................................. 192/58 B; 192/82 T
[58] Field of Search .......................... 192/58 B, 82 T; 123/41.12

[56] References Cited

U.S. PATENT DOCUMENTS 3,155,209 11/1964 Weir .................................. 192/58 B
4,090,596 5/1978 Blair .................................. 192/58 B
4,381,051 4/1983 Kikuchi ............................. 192/82 T
4,386,585 6/1983 Kittel et al. ....................... 123/41.12
4,505,367 3/1985 Martin ............................... 192/58 B
4,629,046 12/1986 Martin ............................... 192/58 B
4,706,792 11/1987 Göb ................................... 192/58 B
4,760,905 8/1988 Göb ................................... 192/58 B Primary Examiner—Richard Lorence
Attorney, Agent, or Firm—Evenson, Wands, Edwards, Lenahan & McKeown

[57] ABSTRACT

A fluid-friction clutch with a temperature control is disclosed for the drive of a fan for the radiator of a motor vehicle engine. It is provided to arrange a shoe made of teflon in the contact area between the bimetallic strip and the ribs provided for the fastening, the bimetallic strip placing itself against this shoe. A durable securing of the position of the bimetallic strip can take place at this shoe.

17 Claims, 4 Drawing Sheets

FLUID FRICTION CLUTCH WITH A TEMPERATURE CONTROL

BACKGROUND AND SUMMARY OF THE INVENTION

The invention relates to a fluid-friction clutch or coupling for driving a vehicle radiator fan or the like and having a bimetallic strip mounted at a front side of a clutch housing for controlling a valve connection between clutch working an storage chambers in the housing.

A fluid-friction clutch of this type is known from German Patent (DE) No. 31 49 104 C2. A bimetallic strip is provided there which extends approximately diametrically over the circular area of the clutch housing and which engages, with its ends, in one recess respectively below radial ribs which are arranged only in the exterior area. The bimetallic strip is pressed into these recesses below the ribs by means of an elastic force which is applied by an actuating pin which projects into the housing interior and there presses on a valve lever which is either constructed to be elastic itself and tries to press the actuating pin toward the outside against the bimetallic strip, or which is loaded by a spring in the corresponding direction.

In the known construction, after the form-fitting locking-in of the ends of the bimetallic strip, a silicone stopper is pressed into each of the two fastening areas on both sides of the bimetallic strip. This stopper, because of its elastic characteristics, does not suppress the temperature-caused movement of the bimetallic strip, but provides that the bimetallic strip maintains its installed position. However, if clutches of the known construction, in an also known manner, are fastened directly to the front ends of crankshafts of engines, the danger exists, despite the securing by silicone stoppers, that as a result of shocks, this securing arrangement will open up, which may lead to wear at the bimetal fastening or also at the actuating pin. As a result, the adjusted connecting temperature of the clutch shifts in the direction of an early drive connection, which is undesirable. In addition, there is the danger that the clutch and therefore the radiator fan will fail.

An object of the invention is therefore to provide a secure and low-wear fastening of the bimetallic strip in a clutch of the above noted type.

In order to achieve this object, an arrangement is provided wherein a shoe constructed of material with good sliding characteristics is provided which is form fittingly slid onto a part of the cooling ribs, which shoe is interposed between projections on the ribs and the metallic strip to hold the bimetallic strip in position. By means of this construction, the bimetallic strip is held in a careful and low-wear fashion but will be secure in its position. Also in cases of high operational stress, particularly in commercial vehicles, no wear can therefore occur at the fastening. The adjusted connecting and disconnecting characteristics of the clutch are thus maintained.

Certain preferred embodiments provide for a slightly conical tapering shoe frame which is slidable on the ribs from the inside toward the outside and has the advantage that an easily mountable shoe is formed which can be slid on the ribs in a simple manner. A radial stop is provided on the shoe in certain preferred embodiments to precisely radially position the bimetallic strip end. Certain preferred embodiments provide that the bimetallic strip has bent tongues at its ends to circumferentially position the bimetallic strip via engagement with the shoe which have the advantage that a securing of the bimetallic strip in circumferential direction is also achieved without any excessive local stress being exercised by pressure forces. Webs interconnecting ends of the cooling ribs over which the shoe is slidingly attached are provided in certain preferred embodiments to facilitate securing of the bimetallic strip in circumferential direction without stress. By means of these characteristics, it is achieved that the contact surface for the shoe at the ribs is relatively large so that the surface pressure remains low. Certain preferred embodiments include shoes with upper and lower transverse webs connected by lateral walls, the lower transverse web resting under the cooling rib end projection and on top of the bimetallic strip ends, to ensure that the large contact surface exists also between the shoe and the bimetallic strip. Preferred embodiments of the shoe have an upper transverse web which locks in behind a step at the cooling ribs to allow a simple fastening and securing of the shoe at the ribs. Especially preferred embodiments include a shoe made of a synthetic resin material such as TEFLON, proven to be particularly effective with respect to the manufacturing and the characteristic of the shoe.

Other objects, advantages and novel features of the present invention will become apparent from the following detailed description of the invention when considered in conjunction with the accompanying drawings.

DETAILED DESCRIPTION OF THE DRAWINGS

Figure 2:
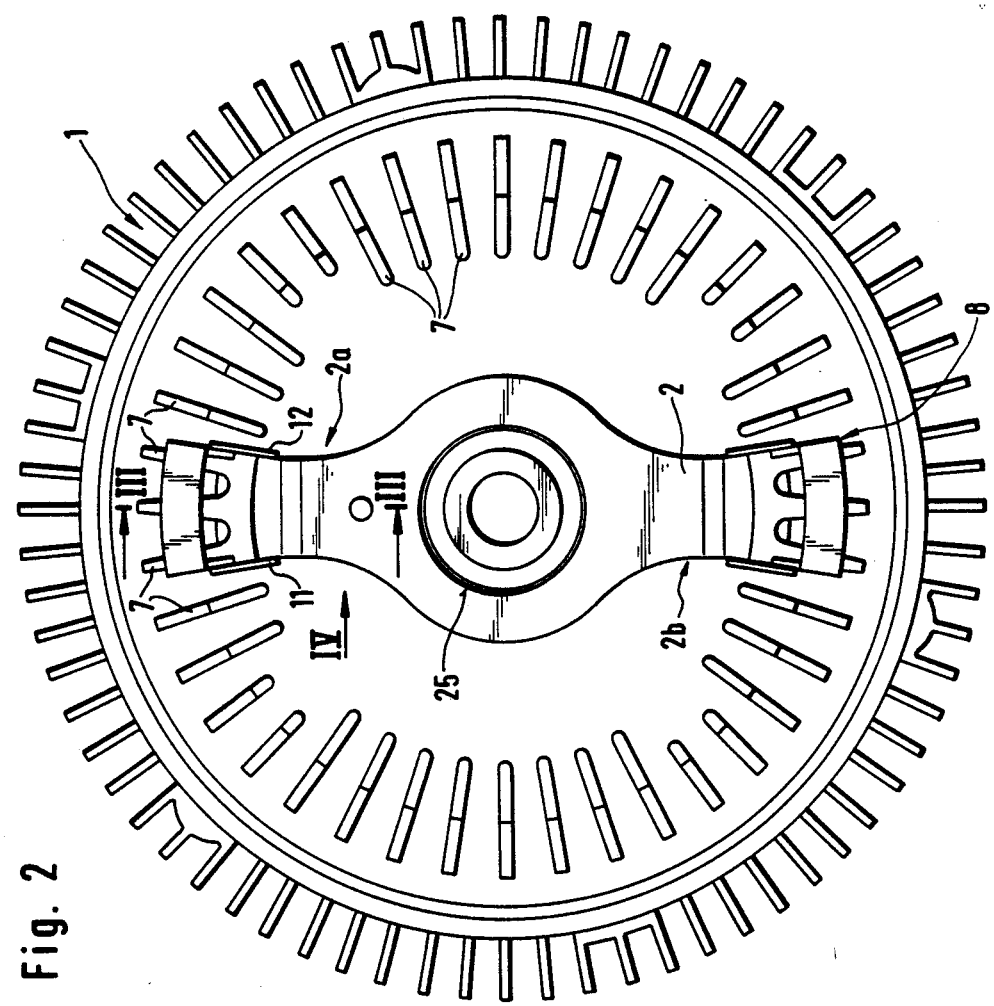
FIG. 2 is a front schematic view of the fluid-friction clutch of FIG. 1, viewed in the direction of arrow II.
Figure 1:
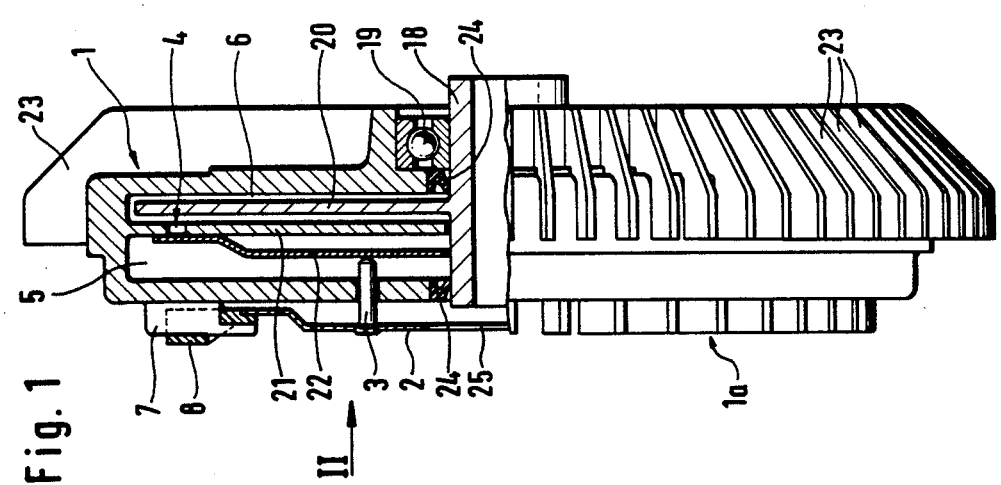
FIG. 1 is a schematic partial longitudinal sectional view of the housing of a fluid-friction clutch constructed according to a preferred embodiment of the invention, which is used for driving a fan for the radiator of a motor vehicle engine.

FIGS. 1 and 2 show that the new fluid-friction clutch includes a housing 1 which is disposed on a hub 18 in a known manner by means of roller bearings 19. Hub 18 may be mounted by means of a central screw bolt guided through the hub 18, for example, directly at the front side of a crankshaft of an engine. The hub 18 is fixedly connected with a clutch disk 20 which projects into the interior of a working chamber 6 and is guided in this working chamber 6 with a narrow gap. The working chamber 6 is provided in the housing 1 and is separated by means of a partition 21 from a storage chamber 5 for shearing fluid, such as silicone fluid, which is also arranged in the housing 1. The storage chamber 5 is usually formed by placing a cover on the clutch housing 1. However, in the case of the fluid-friction clutch according to the invention, these constructive developments are unimportant. The housing 1 is therefore schematically illustrated as one piece.

A feed valve 4 leads from the storage chamber 5 to the working chamber 6 and consists of an opening in the partition 21 and of a control lever 22 which is arranged in the storage chamber and, with its end, can expose or close off the opening in the partition 21, so that it constitutes part of the valve 4. The control lever 22, in a manner not shown in detail because it is known, is arranged in the storage chamber such that it is loaded counterclockwise as viewed in FIG. 1, by an elastic force. This elastic force may be achieved, for example, by the fact that the control lever 22 itself is made of an elastic material and is mounted in such a manner that, as long as it is not acted upon by the actuating Pin and by the bimetallic strip, it projects toward the left from the opening in the partition 21. When the clutch is assembled, it is then pressed toward the right by an actuating pin 3 which is guided tightly into the storage chamber 5 from the outside. The actuating pin 3, in turn, is held in its position by a bimetallic strip 2 which is mounted fixedly on the front side (1a) of the clutch housing 1 which normally is formed by a clutch cover as mentioned above.

The mounting of the bimetallic strip 2 takes place by the fact that both ends 2a, 2b of the bimetallic strip 2 (see also FIG. 3) are held form-fittingly in a recess below projections 7a of ribs 7 which are arranged extending radially on the front side 1a of the clutch, specifically in such a manner that they do not extend to the center of the clutch. The housing 1 of the clutch, on the side facing away from the front side 1a, is also equipped with approximately radially extending cooling ribs 23 and, by means of seals 24, is rotatably arranged with respect to the hub 18.

Figure 3:
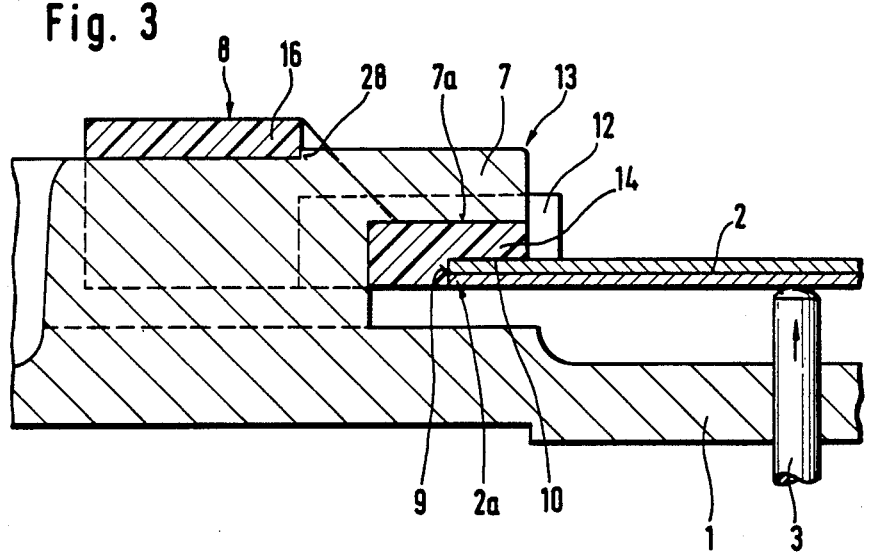
FIG. 3 is an enlarged partial sectional schematic view of the fastening arrangement for the bimetallic strip, viewed in the direction of arrows III—III of FIG. 2.
Figure 4:
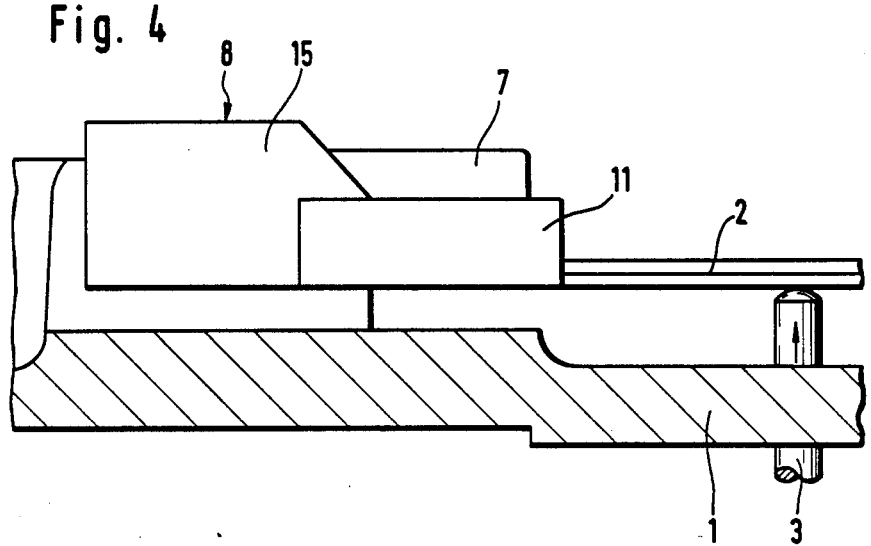
FIG. 4 is a schematic view of the fastening point of FIG. 3, viewed in the direction of arrow IV.
Figure 11:
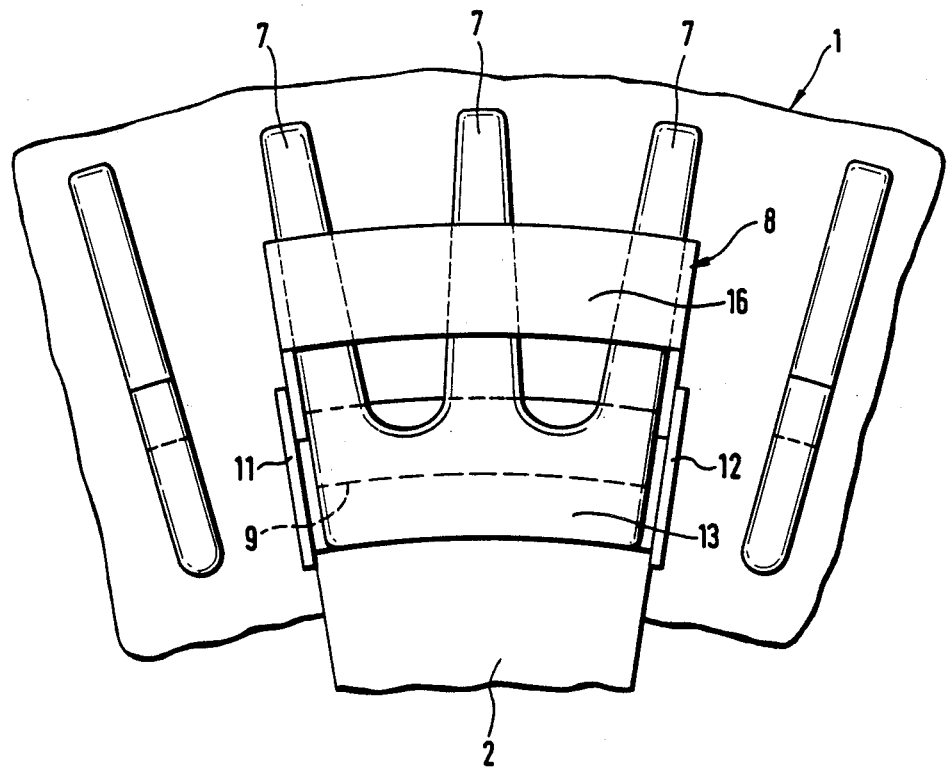
FIG. 11 is a slightly enlarged top view of the shoe according to FIG. 7, but shown in the installed position of the shoe on the clutch housing cover.

FIGS. 3 and 4 show that the ends 2a, 2b of the bimetallic strip 2 rest against a shoe 8. The bimetallic strip 2 also has a central recess 25 in the shown embodiment because of the central screw bolt opening. Bimetallic strip 2 is pressed from below firmly against the recess below the ribs 7 formed by the projections 7a by the effect of the actuating pin 3. In this case, a web 14 of the shoe 8 is provided between the corresponding contact surface at the projections 7a and the end 2a of the bimetallic strip 2, this web 14 (see FIG. 6) being constructed approximately frame-shaped and, as shown in FIG. 11, being pushed on a group of three ribs connected together by a transverse web 13. In this case, the shoe 8 is held by means of its upper transverse web 16 behind a step 28 which is provided on the top side of the ribs 7 and behind which the shoe 8 snaps in when pushed on the group of ribs 7.

Figure 5:
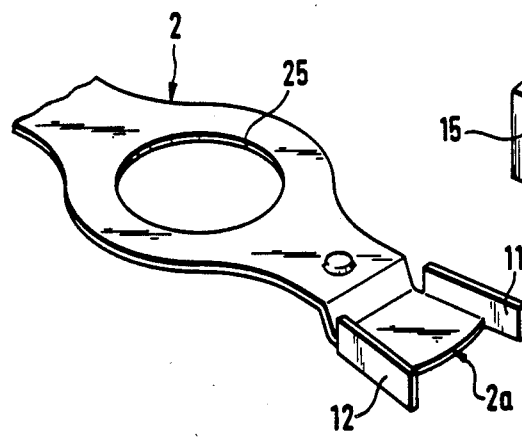
FIG. 5 is a perspective schematic representation of the bimetallic strip which is used in the embodiment of FIG. 1 and 2.
Figure 6:
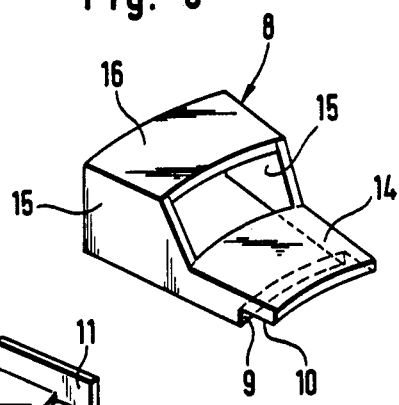
FIG. 6 is the schematic perspective representation of a teflon shoe of the embodiment of FIGS. 1-5 which, for the contact with the bimetallic strip, is to connected with cooling ribs on the housing cover.
Figure 7:
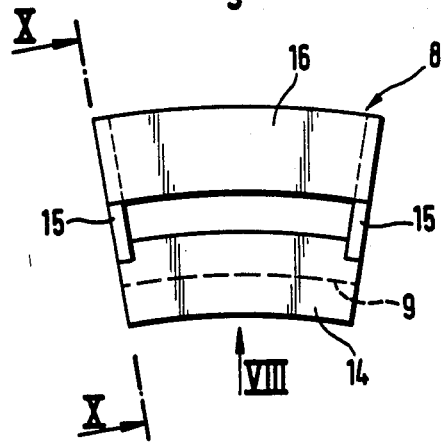
FIG. 7 is a top view of the shoe of FIG. 6.
Figure 9:
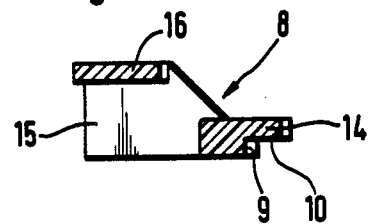
FIG. 9 is a sectional view of the shoe of FIG. 7 and 8, viewed in the direction of arrows IX—IX in FIG. 8.
Figure 8:
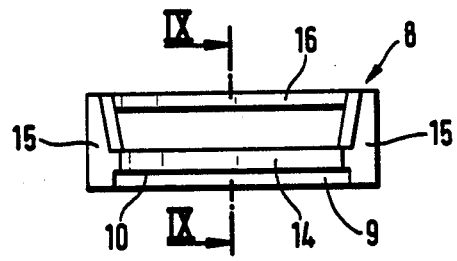
FIG. 8 is a front view of the shoe of FIG. 7, viewed in the direction of arrow VIII of FIG. 7.
Figure 10:
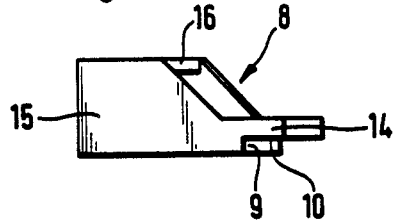
FIG. 10 is a lateral view of the shoe of FIG. 7, 8, and 9, viewed in the direction of the arrows X—X.

FIG. 6 shows that the shoe consists of two transverse webs 14, 16 which are connected with one another by lateral walls 15. Transverse web 14, which comes to rest below the projections 7a, has a contact surface 10 for the bimetallic strip 2 and a stop edge 9 which provides the radial securing of the position of the bimetallic strip 2. FIGS. 4 and 5 show that the bimetallic strip 2 itself is provided at at its end 2a with two opposite tongues 11, 12 which are bent upwards and rest against the lateral walls 15 of the shoe 8 as a lateral guide for the bimetallic strip. Since the group of the three ribs 7 (see FIGS. 2 and 11) has a contour which increases slightly conically from the inside to the outside, because of the radial arrangement of the ribs, and this shape is also provided for the shoe 8 which is to be pushed on this rib group on the outside, the tongues 11 and 12 are also spread with respect to one another at the same slightly conical angle, so that, after the installation of the bimetallic strip 2, they rest against the lateral walls 15 of the shoe 8 with a relatively large surface.

However, it is also contemplated according to a not illustrated embodiment to construct the ribs provided for the fastening of the shoe 8 in such a manner that—in the case of three ribs, as shown in FIGS. 2 and 11—the two outer ribs have outer flanks which extend in parallel to one another. The shoe 8 would then also have parallel outer flanks (lateral walls 15) and interact with tongues 11 and 12 of the bimetallic strip 2 which are parallel to one another. This construction would make it possible to slide the bimetallic strip radially farther during the mounting, which may be advantageous during the installation.

Another possibility to achieve such parallel outer flanks will exist if the shoe 8, as in the embodiment shown, has conical inner flanks at the lateral walls 15, but parallel outer flanks. In this case also, the tongues 11 and 12 may extend in parallel to one another and either rest closely against the shoe or be guided at the shoe with play. If the elastic damping characteristics of the material of the shoe are not sufficient, an elastic mass, such as silicone, may also be inserted into the space provided by the play, for the purpose of securing the position. This provision of silicone is also a contemplated modification of the shown embodiment, to be inserted between the tongues 11 and 12 and the lateral walls 15 of the shoe 8, if a play is provided there. Because of the large contact surface between the tongues and the lateral walls, an excellent damping is provided and a securing of the position of the bimetallic strip which is also sufficient in the case of high shock loads.

FIGS. 7 to 10 clearly show the details of the construction of a shoe 8 made of a synthetic resin, such as TEFLON. Its inner contour is adapted to the outer contour of the group of three ribs 7 shown in FIG. 11. During the mounting, it is pushed from the direction of the center of the clutch housing 1 on this rib group, its upper transverse web 16 then snapping behind the step 28. After this has taken place at the two opposite sides, the bimetallic strip 2 can be guided from below under the transverse web 14, in which case, for the mounting, the elastic force exercised by the actuating pin 3 must be overcome by the pressing-down of the bimetallic strip 2. When the ends 2a each rest against the stop edge 9 of the assigned transverse web 14 of the shoes 8, the elastic force provides, by means of the actuating pin 3, that the bimetallic strip, which otherwise is free, rests firmly against the contact surface 10 of the transverse web 14 of the shoes 8. With its ends 2a, it will then also be guided at the stop edges 9 and will thus be secured in its radial position. Tongues 11 and 12 prevent lateral twisting.

However, FIG. 11 also shows clearly that in the embodiment shown the group of the three ribs 7 is held together by a web 13 over which the shoe 8 is slid, in each case, at its front edges pointing toward the center. By means of this construction, it can be achieved that the contact surface 7a for the transverse web 14 of the shoe and for the ends 2a of the bimetallic strip 2 becomes significantly larger. The surface pressure can therefore be kept relatively low in this contact area. This, in turn, increases the durability of the new fastening arrangement. It was found that the bimetallic strip which is fastened in the described manner is also held securely in the case of a high stressing of the clutch as a result of shocks or the like. The adjusted shift point of the clutch, at which shearing fluid reaches the working chamber by the corresponding actuating of the valve 4, is not affected even after a longer operating time.

Figure 12:
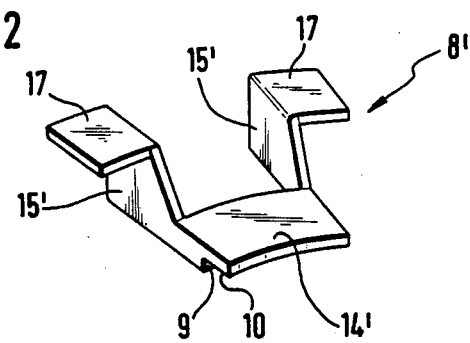
FIG. 12 is a variant of the shoe of FIGS. 6 to 10.

FIG. 12 shows a variant of a shoe 8' which can be pushed on the ribs 7 instead of the frame-shaped shoe 8 of FIG. 6. Shoe 8' has the lower transverse web 14' which, as in the case of shoe 8 of the other figures, is also provided with the stop edge 9 and the contact surface 10 for the bimetallic strip. The lateral walls 15' may also be used for a contacting by the tongues 11 and 12. What is not provided, however, is the upper transverse web 16 of the shoe 8 which, in the embodiment of FIG. 12, is replaced by two wings 17 projecting toward the outside, these wings 17 reaching over adjacent ribs. The ribs would be modified so as not to have the configuration with the web 13 so as to accommodate this connection. When a shoe 8' according to FIG. 12 is used, the advantage is also achieved that, as in the other embodiments, no direct metal-on-metal contact takes place between the bimetallic strip 2 and the ribs 7 which, as a rule, consist of aluminum. However, the embodiment of the shoe of FIG. 6, compared to that of FIG. 12, has a higher stability as a result of the frame construction.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:
1. A fluid-friction clutch comprising
   a housing and a clutch disk within said housing, said housing and said clutch disk serving as input and output elements for the clutch;
   a storage chamber in said housing;
   a working chamber in said housing separated from said storage chamber by a partition in the housing;
   a valve communicating shearing fluid from the storage chamber through the partition to the working chamber;
   cooling ribs with projections extending radially inwardly on a side of said housing;
   an actuating pin coupled to the valve and controlling the opening of the valve;
   a bimetallic strip mounted on said housing and coupled to the actuating pin to control movement of the actuating pin against an elastic force, ends of said bimetallic strip extending under said projections and being held under said projections by the elastic force; and
   a shoe with good sliding characteristics that is form-fittingly slid on a part of the ribs, the shoe including means interposed between the ends of the bimetallic strip and the projections for allowing relative sliding movement of the bimetallic strip to the projections and for maintaining a separation of the bimetallic strip from the projections.

2. A fluid-friction clutch according to claim 1, wherein the shoe includes a slightly conical frame which is slid on the ribs from the radial inside to the outside of the clutch housing.

3. A fluid friction clutch according to claim 1, wherein the shoe is provided with a stop edge for securing the radial position of the bimetallic strip.

4. A fluid friction clutch according to claim 3, wherein the bimetallic strip is pressed by the actuating pin against a stop surface of the shoe which is located further from the clutch disk in a normal direction than the stop edge.

5. A fluid friction clutch according to claim 1, wherein the shoe has outer sides and the bimetallic strip is provided at its ends with bent tongues which rest on the outer sides of the shoe.

6. A fluid friction clutch according to claim 1, where the cooling ribs have radially inward pointing edges, the radially inward-pointing edges of at least two adjacent ribs being connected with one another by means of a web.

7. A fluid friction clutch according to claim 6, wherein the shoe has an upper and a lower transverse web which are connected with one another by lateral walls, the lower transverse web resting against the web of the ribs and, on the side facing away from the web, having a contact surface for the bimetallic strip.

8. A fluid friction clutch according to claim 6, where the ribs have steps, and the upper transverse web of the shoe includes a radially inward-directed edge that locks in behind the steps at the ribs.

9. A fluid friction clutch according to claim 1, wherein the shoe is made of a plastic material, particularly of teflon.

10. A fluid friction clutch according to claim 3, wherein the shoe includes a slightly conical frame which is slid on the ribs from the radial inside to the outside of the clutch housing.

11. A fluid friction clutch according to claim 10, wherein the bimetallic strip is pressed by the actuating pin against the stop surface of the shoe which is located further from the clutch disk in a normal direction than the stop edge.

12. A fluid friction clutch according to claim 11, wherein the cooling ribs have radially inward-pointing edges, the bimetallic strip is provided at its ends with bent tongues which rest on the outer sides of the shoe.

13. A fluid friction clutch according to claim 12, wherein the cooling ribs have radially inward-pointing edges, the radially inward-pointing edges of at least two adjacent ribs being connected with one another by means of a web.

14. Fluid-friction clutch comprising
   a housing and a clutch disk within said housing, said housing and said clutch disk serving as input and output elements for the clutch;
   a storage chamber in said housing;

a working chamber in said housing separated from said storage chamber by a partition in the housing;

a valve communicating shearing fluid from the storage chamber through the partition to the working chamber;

cooling ribs with projections extending radially inwardly on a side of said housing;

an actuating pin coupled to the valve and controlling the opening of the valve;

a bimetallic strip mounted on said housing and coupled to the actuating pin to control movement of the actuating pin against an elastic force, ends of said bimetallic strip extending under said projections and being held under said projections by the elastic force; and a shoe with good sliding characteristics that is form-fittingly slid on a part of the ribs, between the ends of the bimetallic strip and the projections;

wherein the shoe is provided with a stop edge for securing the radial position of the bimetallic strip;

wherein the shoe includes a slightly conical frame which is slid on the ribs from the radial inside to the outside of the clutch housing;

wherein the bimetallic strip is pressed by the actuating pin against the stop surface of the shoe which is located further from the clutch disk in a normal direction than the stop edge;

wherein the cooling ribs have radially inward-pointing edges, the bimetallic strip is provided at its ends with bent tongues which rest on the outer sides of the shoe; and wherein the cooling ribs have radially inward-pointing edges, the radially inward-pointing edges of at least two adjacent ribs being connected with one another by means of a web.

15. A fluid-friction clutch comprising a housing and a clutch disk within said housing, said housing and said clutch disk serving as input and output elements for the clutch;

a storage chamber in said housing;

a working chamber in said housing separated from said storage chamber by a partition in the housing;

a valve communicating shearing fluid from the storage chamber through the partition to the working chamber;

cooling ribs with projections extending radially inwardly on a side of said housing;

an actuating pin coupled to the valve and controlling the opening of the valve;

a bimetallic strip mounted on said housing and coupled to the actuating pin to control movement of the actuating pin against an elastic force, ends of said bimetallic strip extending under said projections and being held under said projections by the elastic force; and a shoe with good sliding characteristics that is form-fittingly slid on a part of the ribs, between the ends of the bimetallic strip and the projections;

wherein the cooling ribs have radially inward-pointing edges, the radially inward-pointing edges of at least two adjacent ribs being connected with one another by means of a web.

16. A fluid friction clutch according to claim 15, wherein the shoe has an upper and a lower transverse web which are connected with one another by lateral walls, the lower transverse web resting against the web of the ribs and, on the side facing away from the web, having a contact surface for the bimetallic strip.

17. A fluid friction clutch according to claim 15, where the ribs have steps, and the upper transverse web of the shoe includes a radially inward-directed edge that locks in behind the steps at the ribs.

* * * * *